United States Patent [19]

Warchol

[11] 4,212,095

[45] Jul. 15, 1980

[54] BEARING COMPONENTS AND METHODS OF MAKING SAME

[76] Inventor: Henry A. Warchol, 2 Sackville Ave., Westfield, Mass. 01085

[21] Appl. No.: 876,899

[22] Filed: Feb. 13, 1978

[51] Int. Cl.² .............................................. B21K 1/05
[52] U.S. Cl. .......................... 29/148.4 C; 29/149.5 S; 113/117
[58] Field of Search ............... 29/149.5 S, 148.4 C; 113/117, 116 E, 116 B, 116 D, 116 V, 116 Y, 116 BB

[56] References Cited

U.S. PATENT DOCUMENTS

| | | | |
|---|---|---|---|
| 1,602,350 | 10/1926 | Fernstrom | 29/148.4 C |
| 2,349,738 | 5/1944 | Le Jeune | 113/116 D |
| 2,386,311 | 10/1945 | Hanrahan | 113/116 BB |
| 2,944,502 | 7/1960 | Lemmerz | 113/116 DX |
| 2,983,033 | 5/1961 | Cox | 113/116 D |
| 3,129,505 | 4/1964 | Cox | 113/116 D |
| 3,365,775 | 1/1968 | Cavagnero et al. | 29/148.4 C |
| 3,499,200 | 3/1970 | Wilson | 113/117 |
| 3,526,026 | 9/1970 | Warchol | 29/148.4 C |

FOREIGN PATENT DOCUMENTS 206066 2/1955 Australia .............................. 113/116 D

*Primary Examiner*—Francis S. Husar
*Assistant Examiner*—V. K. Rising
*Attorney, Agent, or Firm*—Ross, Ross & Flavin

[57] ABSTRACT

Bearing components, such as cages, rings, retainers, washers, spacers and the like, are formed from flat stock strips in preference to the employment of known methods of blanking same from stock having a dimension as great or greater than the larger dimension of the end product.

5 Claims, 67 Drawing Figures

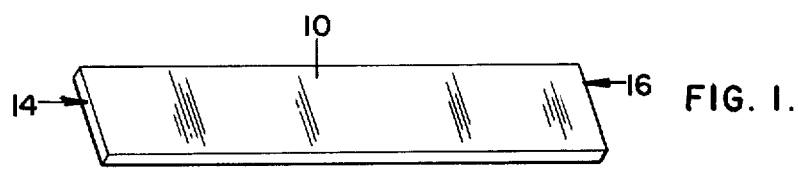
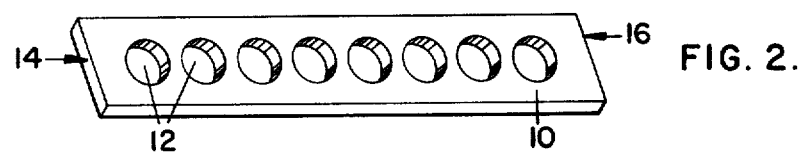
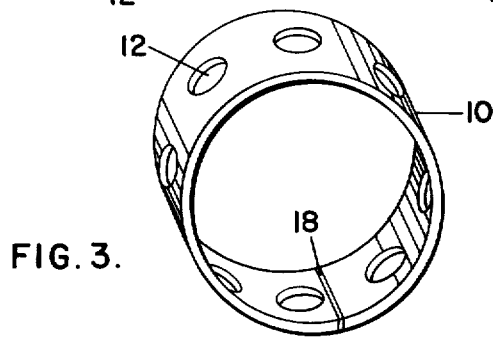
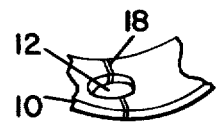
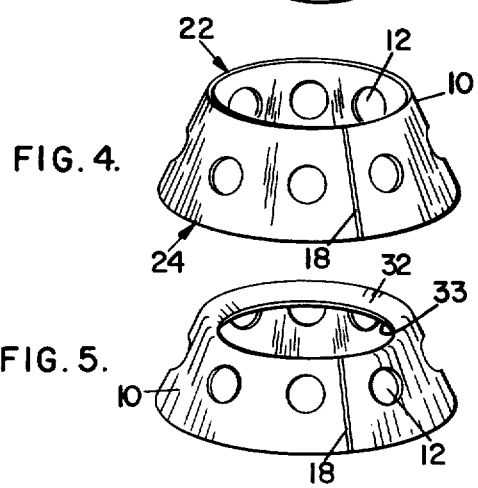
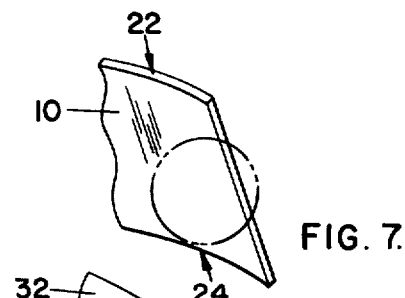
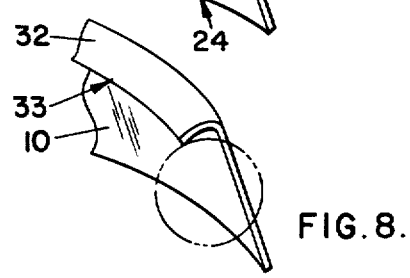
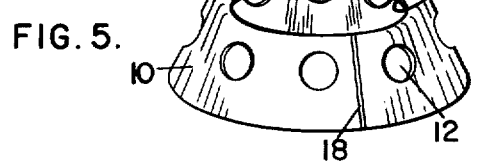
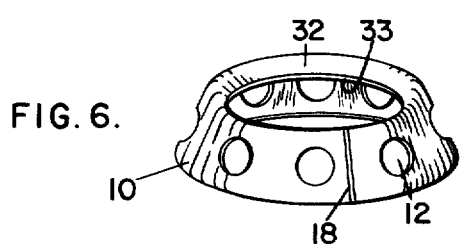
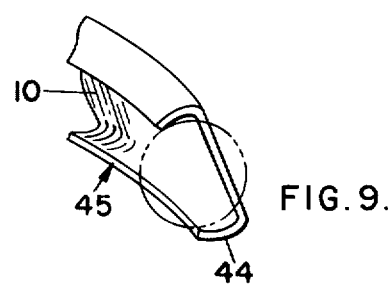
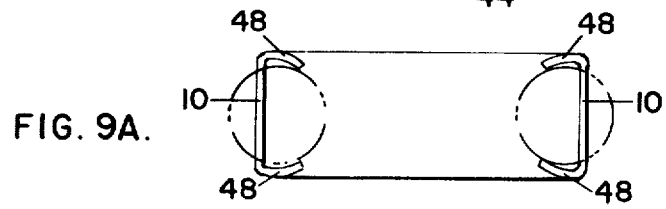

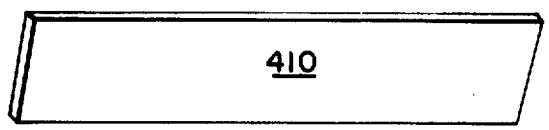
FIG. 32.
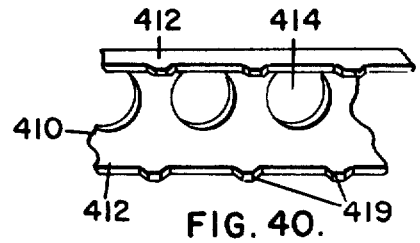
FIG. 40.
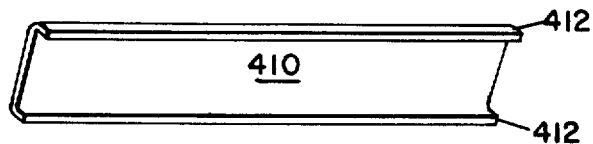
FIG. 33.
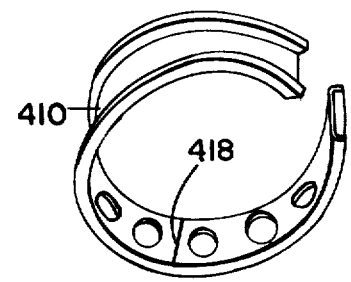
FIG. 41.
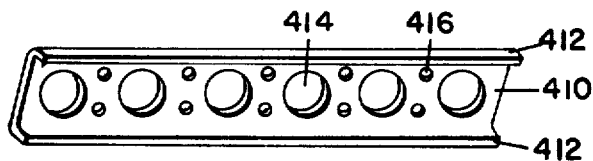
FIG. 34.
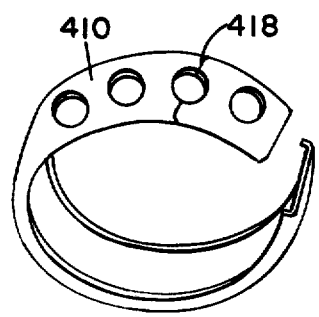
FIG. 35.
FIG. 34A.
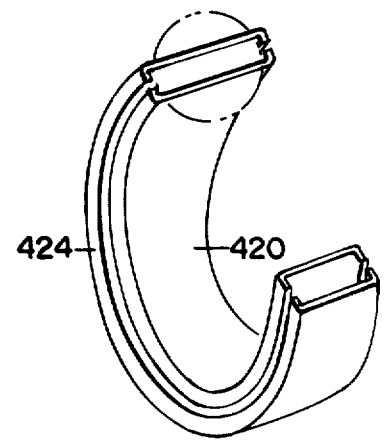
FIG. 42.
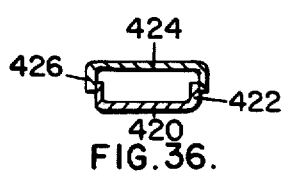
FIG. 36. FIG. 37.
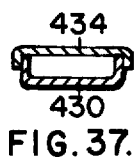
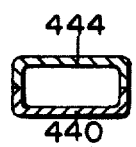
FIG. 38.
FIG. 39.
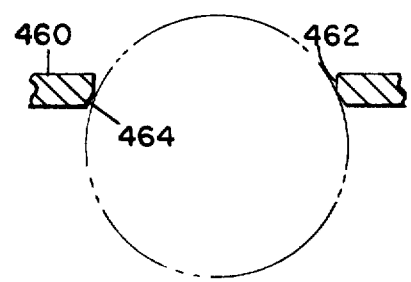
FIG. 43.

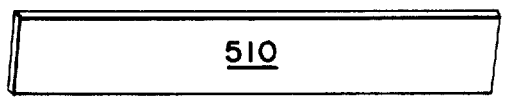
FIG. 44.
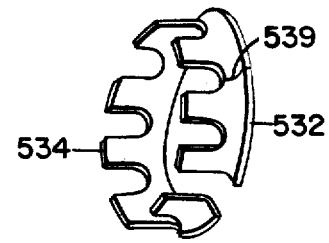
FIG. 48.
FIG. 45.
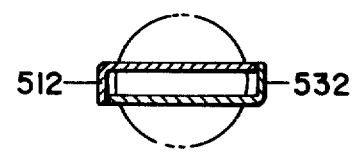
FIG. 49.
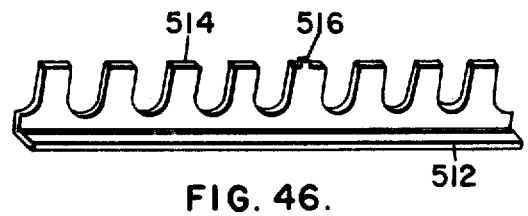
FIG. 46.
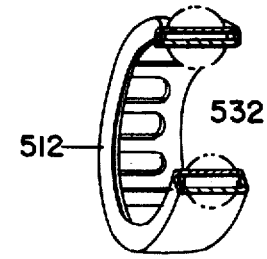
FIG. 50.
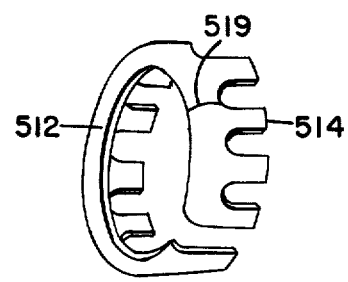
FIG. 47.
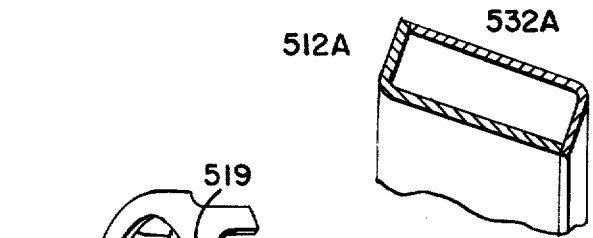
FIG. 51B.
FIG. 51A.
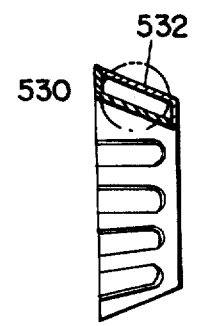
FIG. 51.

BEARING COMPONENTS AND METHODS OF MAKING SAME

The invention relates to the manufacture of such as cages, rings, retainers, washers, spacers or the like, generally from flat elongated bar stock which is given a round or circular or cylindrical or tubular configuration with the abutting ends of the flat stock being joined as by weldments or other suitable jointure techniques.

Such manufacturing technique is preferred to the more commonly known system of blanking an end product from a planar sheet of material, significant economies in material being effected.

Herewith, the waste of expensive stock is minimized, expensive machining operations are dispensed with, and the need for special machinery is obviated.

A first exemplification teaches a method of producing a combination radial and axial thrust bearing retainer or cage from a planar strip as contrasted with the presently known wasteful method of producing such a retainer from a strip having a width greater than the larger retainer diameter.

The method hereof allows for easy adaptation to a fully automated system of producing and assembling the retainer with a significant resultant savings in material.

The exemplification is shown primarily in connection with a combination axial and radial thrust bearing retainer or cage, but it is to be understood that an axial thrust only type of cage or a radial thrust only type of cage might be produced with equally successful results.

A second exemplification teaches a method of producing a circular flat ring from a narrow width of strip in manner such as to obviate the present wasteful method of producing rings from material having a width greater than the ring O.D. Such ring geometry of course contemplates the pocketing of bearing balls when two of such rings are so assembled as jointly to define a suitable ball bearing cage.

A third exemplification teaches a method of making a flat planar ring of small axial thickness and larger planar dimensions from a ring of greater axial length and smaller planar thickness, such ring being capable of being transformed into a multiplicity of shapes and forms of bearing retainers or even washers.

A fourth exemplification teaches a method of making a flat planar ring from a circular, tubular ring but with contouring blanked out at the peripheries for the making of a radial and axial bearing cage.

A fifth exemplification teaches a method of making a bearing cage comprised of an outside ring with its outside edges turned inwardly and an inside ring with its outside edges turned outwardly.

A sixth exemplification teaches a method of making a bearing cage from two rings, one of a small diameter and one of a large diameter. One edge is scalloped for the axial surface and the opposite edge is upset into a planar face.

The seventh exemplification teaches a method of dimpling a bearing ring.

The prior art references which I have located and evaluated in the preparation of this application include:

Parsons, U.S. Pat. Nos. 1,629,173 of May 17, 1927, which, while it relates to one of the preferred end products of the invention, does not teach the steps of the herein disclosed method of producing same.

Rouanet, 1,650,852 of Nov. 29, 1927, teaches the forming of a circular ring from a strip of straight metal but the transformation of an annular ring to a flat washerlike type of flat ring is not anticipated.

Anderson, 2,783,104 of Feb. 26, 1957, teaches a pair of retainer halves per se but not the precise method of producing same.

Axbard, 3,644,971 of Feb. 29, 1972, teaches a method of forming from a plurality of coils to form washer-like members which are then compressed to uniform cross-sectioning but this is not the teaching of this invention.

In the drawings:

THE FIRST EXEMPLIFICATION

FIG. 1 is an isometric view of a fragment of a flat metal blank of narrow width and of suitable length from which the exemplified retainer cage is formed;

FIG. 2 is an isometric view of the FIG. 1 blank following the piercing of openings therethrough;

FIG. 3 is an isometric view of the FIG. 2 blank formed into an annular ring;

FIG. 3A is a fragmentary isometric view of the FIG. 3 ring with an opening therethrough at the line of jointure;

FIG. 4 is an isometric view of the FIG. 3 ring formed into a frustoconical configuration;

FIG. 5 is an isometric view showing the FIG. 4 ring formed with its upper peripheral edge turned inwardly;

FIG. 6 is an isometric view showing the FIG. 5 ring formed with its lower peripheral edge turned inwardly;

FIG. 7 is a fragmentary isometric view of the curved wall of the FIG. 4 ring;

FIG. 8 is a fragmentary isometric view of the curved wall of the FIG. 5 ring;

FIG. 9 is a fragmentary isometric view of the curved wall of the FIG. 6 ring;

FIG. 9A is a sectional view of the FIG. 3 ring formed as an axial thrust bearing;

THE SECOND EXEMPLIFICATION

Figure 10:
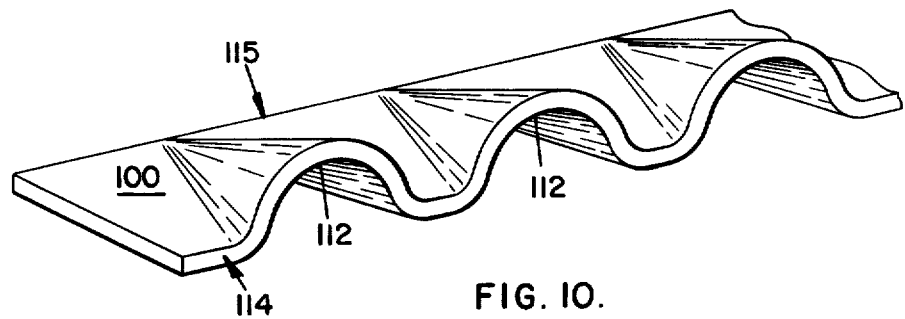
Figure 11:
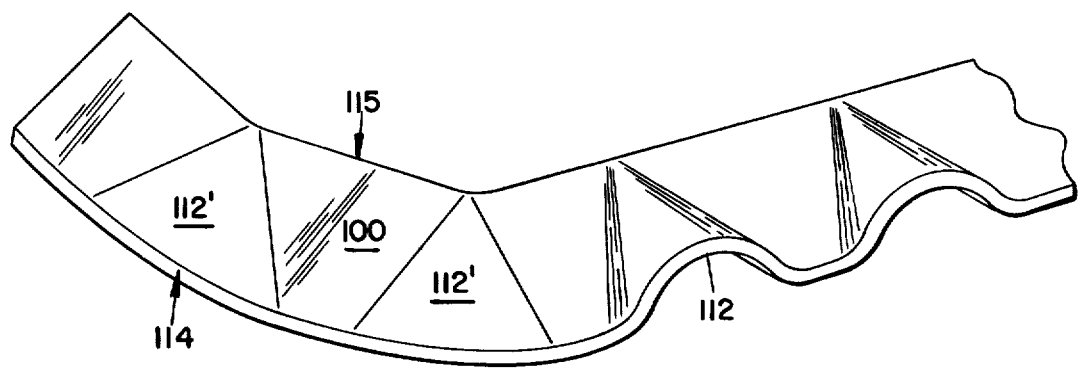
Figure 12:
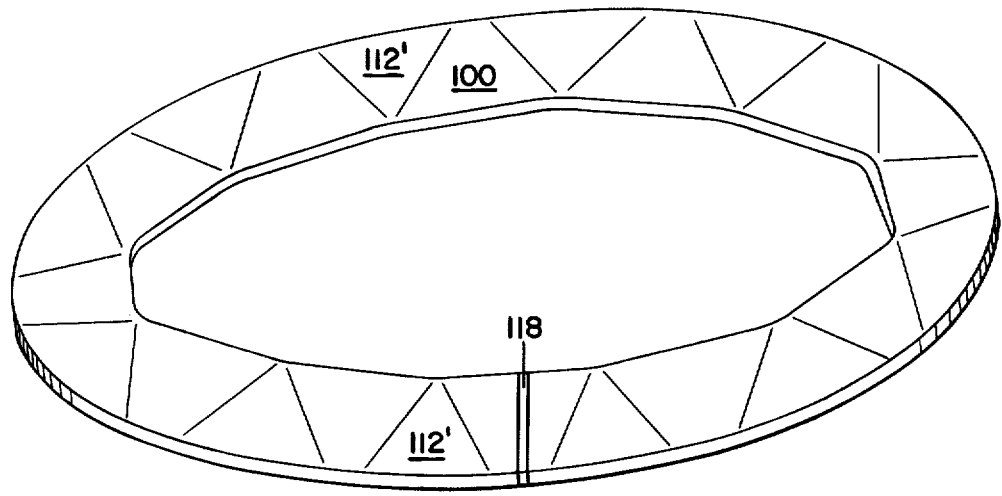
Figure 13:
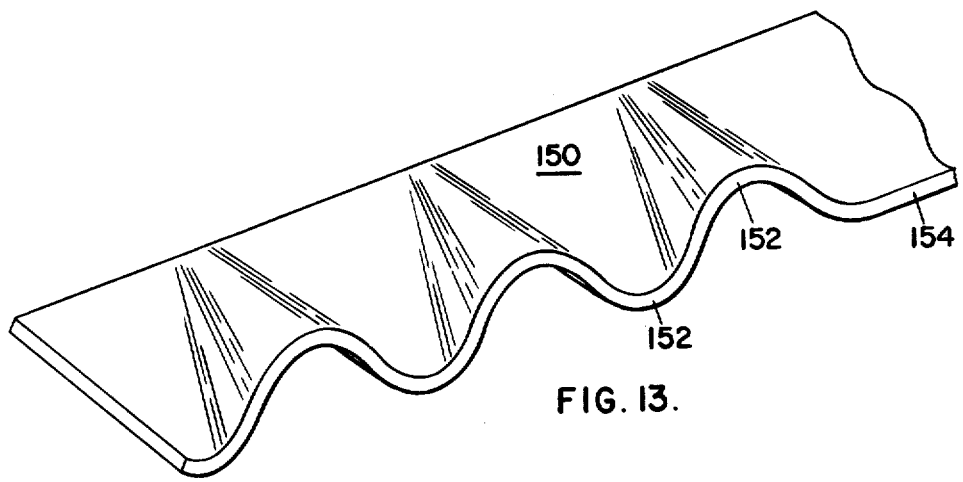
Figure 14:
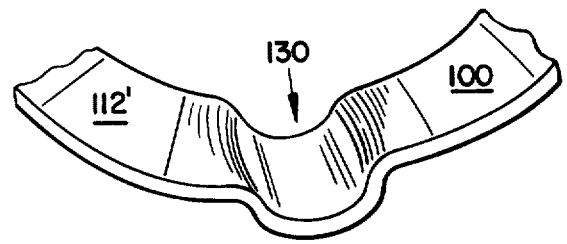
Figure 15:
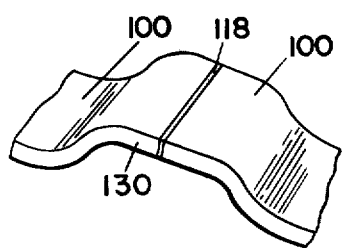
Figure 16:
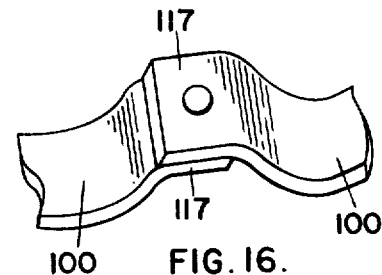
Figure 17:
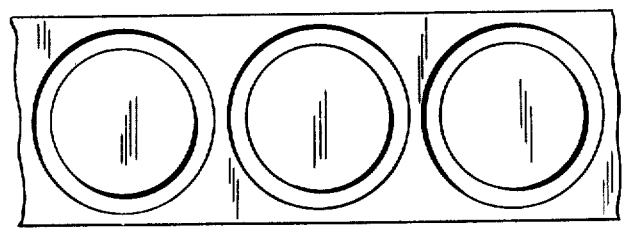

FIG. 10 is an isometric view of a fragment of a narrow width of strip metal provided with spaced undulations adjacent one side edge thereof;

FIG. 11 is an isometric view showing the effect of flattening certain of the undulations of the FIG. 10 strip;

FIG. 12 is an isometric view showing the effect of flattening all of the undulations of such as the FIG. 10 strip;

FIG. 13 is an isometric view of a fragment of a metal strip showing spaced undulations in alternate directions to provide a sinuous configuration to the end face;

FIG. 14 is an isometric view of a fragment of the FIG. 12 ring showing a pocket formed therein;

FIGS. 15 and 16 are fragmentary isometric views showing different forms of end joinder of the FIG. 14 ring;

FIG. 17 is a showing of a prior art technique of stamping rings from a plate;

THE THIRD EXEMPLIFICATION

Figure 19:
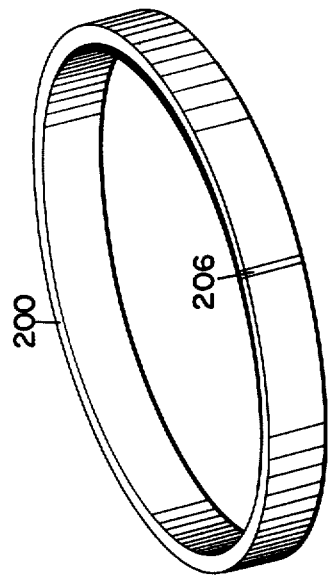
Figure 22:
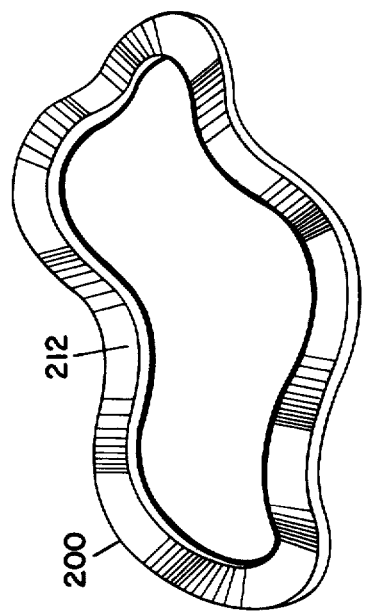
Figure 18:
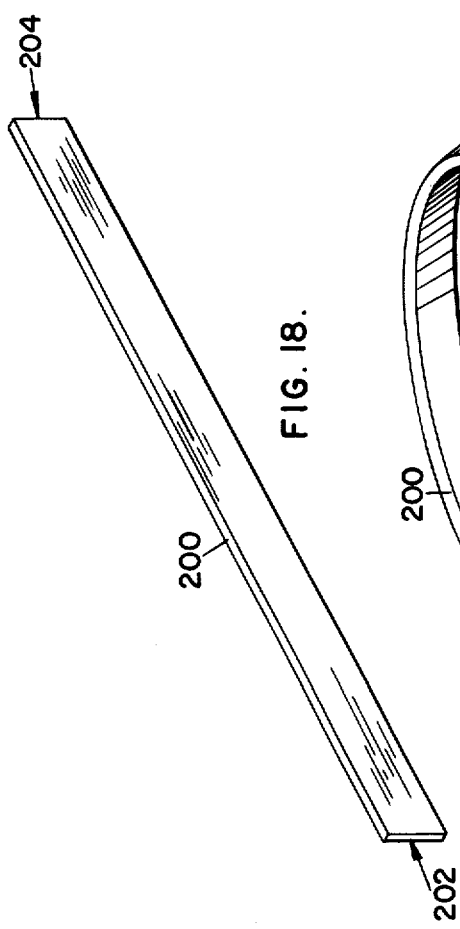
Figure 20:
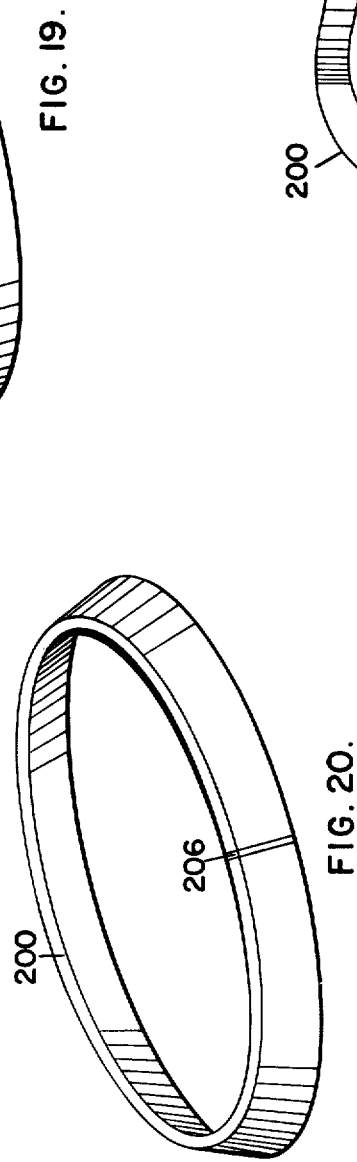
Figure 21:
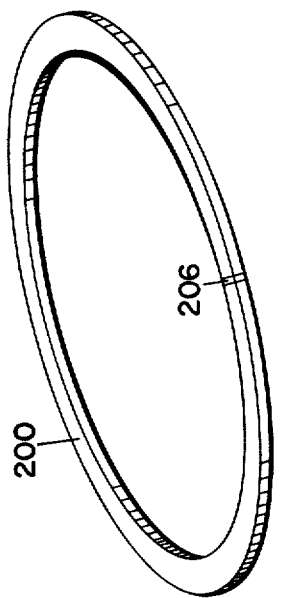
Figure 22A:
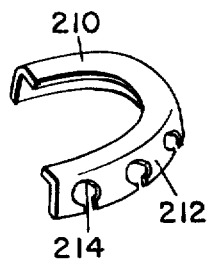
Figure 22B:
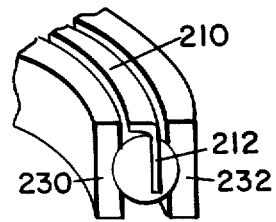
Figure 22C:
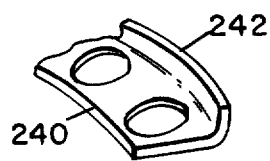
Figure 22D:
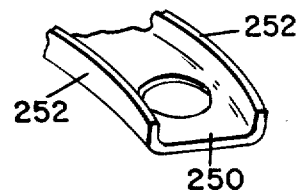
Figure 22E:
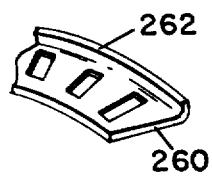
Figure 22F:
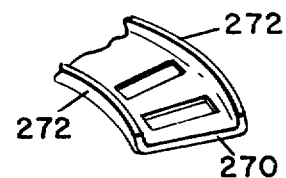

FIG. 18 is an isometric view of a fragment of a flat metal strip from which the exemplified ring is formed;

FIG. 19 is an isometric view of the FIG. 18 strip formed into an annular ring;

FIG. 20 is an isometric view of the FIG. 19 ring with a conical configuration imparted thereto;

FIG. 21 is an isometric view of the FIG. 20 ring flattened into a flat ring configuration;

FIG. 22 is an isometric view of the FIG. 21 ring formed as a lock washer or formed as a retainer with spaced ball-receiving pockets;

FIGS. 22A-22F are fragmentary isometric views of the FIG. 21 ring formed into various styles of bearing retainers; FIG. 22A shows a ring with an outer peripheral edge turned downwardly and scalloped; FIG. 22B shows a ring with an outer peripheral edge turned downwardly and positioned between an inner and outer race; FIG. 22C shows a radial thrust ball type with one edge turned upwardly; FIG. 22D shows a radial thrust ball type with both edges turned upwardly; FIG. 22E shows a radial thrust roller bearing type with one edge turned upwardly; FIG. 22F shows a radial thrust roller bearing type with both edges turned upwardly;

THE FOURTH EXEMPLIFICATION

Figure 23:
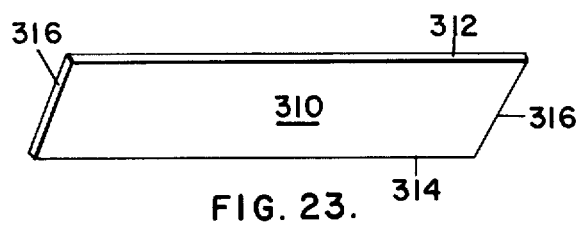
Figure 27:
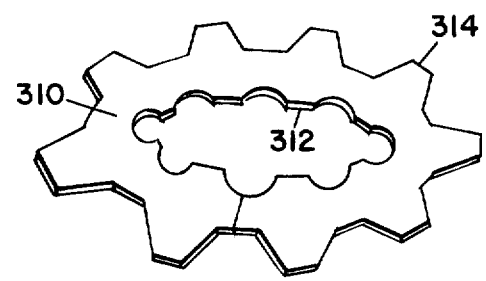
Figure 24:
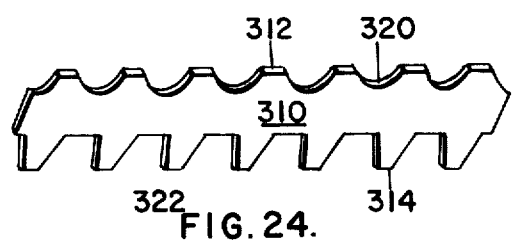
Figure 28:
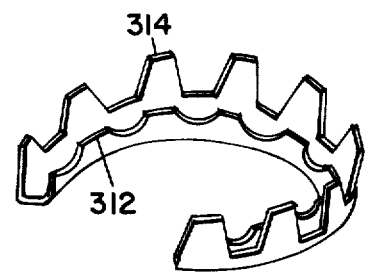
Figure 25:
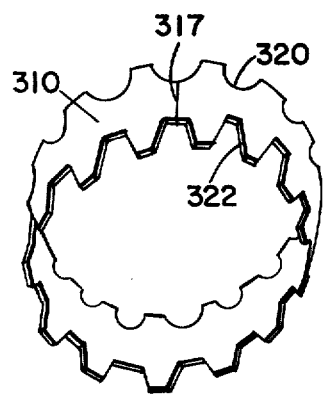
Figure 29:
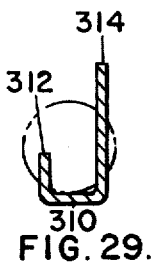
Figure 30:
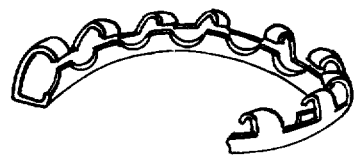
Figure 26:
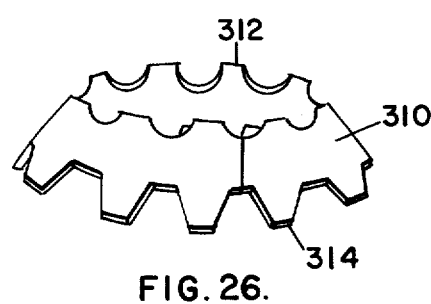
Figure 31:
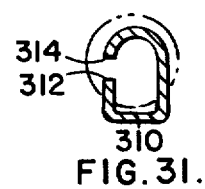

FIG. 23 is an isometric view of a fragment of a flat blank from which the exemplified bearing cage is formed;

FIG. 24 is an isometric view of the FIG. 23 blank configured with opposite scalloped edges;

FIG. 25 is an isometric view of the scalloped FIG. 24 blank formed into an annular ring;

FIG. 26 is an isometric view of the FIG. 25 ring with a conical configuration imparted thereto;

FIG. 27 is an isometric view of the FIG. 26 ring flattened into a flat ring shape;

FIG. 28 is a fragmentary isometric view of the FIG. 27 ring with both of its inner and outer edges having been turned upwardly;

FIG. 29 is a sectional view through the FIG. 28 ring;

FIG. 30 is a fragmentary isometric view of the FIG. 28 ring with its outer edge turned inwardly and downwardly toward the inner edge;

FIG. 31 is a sectional view through the FIG. 30 ring;

THE FIFTH EXEMPLIFICATION

FIG. 32 is an isometric view of a fragment of a flat metal blank from which a new bearing cage is formed;

FIG. 33 is an isometric view of the FIG. 32 blank with its opposite outer edges turned inwardly;

FIG. 34 is an isometric view of the FIG. 33 blank provided with ball receiving openings and oil apertures;

FIG. 34A is an isometric view of the FIG. 33 blank provided with roller bearing openings;

FIG. 35 is a fragmentary isometric view of the FIG. 33 blank formed into an annular outside ring;

FIG. 36 is a sectional view of an outside ring with its outer edges turned inwardly and a mating inside ring with its outer edges turned outwardly and disposed therebelow;

FIG. 37 is a sectional view similar to FIG. 36 with the exception that the outer edges of the inside ring are in confrontation with the inside surface of the outside ring;

FIG. 38 is a sectional view similar to FIG. 36 with the exception that the inside and outside rings are in confrontation with each other at their outer inwardly and outwardly turned edges;

FIG. 39 is a sectional view similar to FIG. 36 with the exception that the outside edges of the outside ring are spaced from a flat planar surface of a flat, planar inside ring;

FIG. 40 is a fragmentary isometric view of the FIG. 33 blank provided with weld upsets;

FIG. 41 is a fragmentary isometric view of a formed annular inside ring;

FIG. 42 is a fragmentary isometric view of the inside and outside rings shown in spaced relationship as to each other;

FIG. 43 is a sectional view showing an annular bevel on the ball opening of an inside ring;

THE SIXTH EXEMPLIFICATION

FIG. 44 is an isometric view of a flat metal blank from which still different series of bearing steps is formed;

FIG. 45 is an isometric view of the FIG. 44 blank with an upturned edge;

FIG. 46 is an isometric view of the FIG. 45 blank with the upturned edge being scalloped;

FIG. 47 is an isometric view of the FIG. 46 blank formed into an outside annular ring with one scalloped edge and with the opposite edge turned inwardly forming a diameter smaller than the O.D. of the formed ring;

FIG. 48 is an isometric view of the FIG. 46 blank formed into an inside annular ring with one scalloped edge and with the opposite edge turned outwardly forming a diameter larger than the O.D. of the formed ring;

FIGS. 49 and 50 are sectional and fragmentary isometric views respectively of the outside and inside rings of FIGS. 47 and 48 joined together to form a completed bearing cage;

FIG. 51 is a sectional view of a modified form of the FIG. 50 bearing cage in the form of a frusto conical retainer with the outside and inside rings being tapered;

FIG. 51A is a fragmentary isometric view of a tapered roller bearing cage showing the butt welding of the confronting edges and surfaces at the axial plane;

FIG. 51B is a fragmentary isometric view of modified form of the FIG. 51 tapered roller bearing cage showing the butt welding of the confronting edges and surfaces at the radial plane;

THE SEVENTH EXEMPLIFICATION

Figure 52:
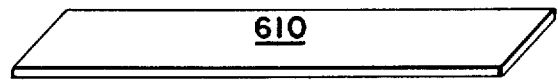
Figure 53:
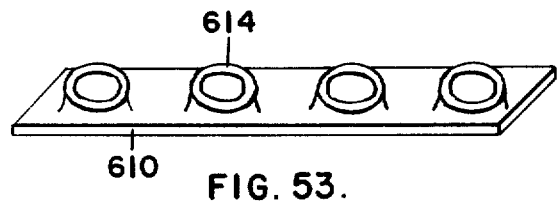
Figure 54:
Figure 56:
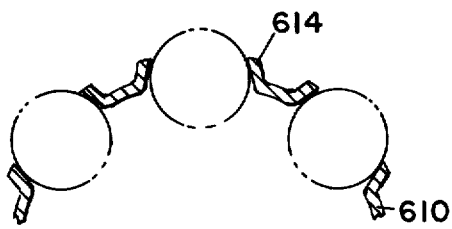
Figure 55:
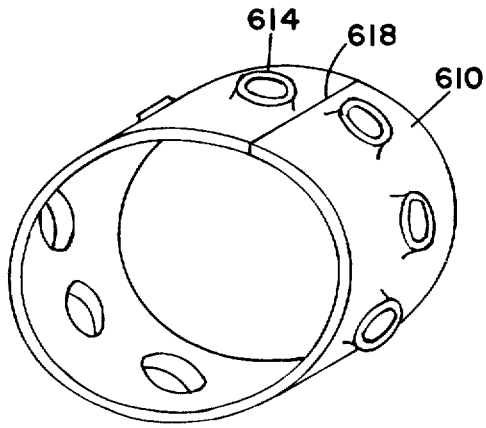

FIG. 52 is an isometric fragmentary view of a flat metal blank from which another exemplified type of bearing cage may be formed;

FIG. 53 is an isometric fragmentary view of the FIG. 52 blank with a plurality of dimpled openings formed therein;

FIG. 54 is a sectional fragmentary view of the FIG. 53 blank with balls received in the dimpled openings;

FIG. 55 is an isometric view of the FIG. 53 blank formed as an annular ring; and FIG. 56 is a sectional view of the FIG. 55 ring.

THE FIRST EXEMPLIFICATION

FIGS. 1-9A

In accordance with FIGS. 1-9A, there is shown a method for making a combination axial thrust bearing, but it is to be understood that an axial only cage or a radial only cage or retainer may be made in accordance with this teaching.

A narrow width of flat metal 10, of a suitable predetermined length, as shown in FIG. 1, is punched with a plurality of equispaced aligned openings 12 therethrough, as shown in FIG. 2, the openings provided for the eventual circumferential equispacing of the supported bearing balls in the assembled retainer.

As a next forming step, as shown in FIG. 3, the punched strip 10 is formed into a cylindrical ring, with the opposite ends 14 and 16 being welded together along the line of jointure 18.

In a following forming step, shown in FIG. 4, the ring is reformed with a frustoconical shape, with one annular edge 22 defining a relatively small circumference and the other annular edge 24 defining a relatively large circumference, and with the midsection along the centerline of openings 12 retaining the original diameter as generated when original flat strip 10 was formed into the FIG. 3 cylindrical ring.

In a subsequent forming step, as shown in FIGS. 5 and 8, the upper peripheral edge of the ring is turned inwardly and downwardly thereby defining an inwardly bent lip or ledge 32 circumscribing a new upper central opening 33.

And in another subsequent forming step, as shown in FIGS. 6 and 9, the frustoconical ring is provided with an inward bending of the lower peripheral edge portion of the ring so as to define an inwardly bent lip or ledge 44 circumscribing a new lower central opening 45, which central opening 45 is of a diameter greater than the diameter of upper central opening 33.

The salient feature hereof is that there has thus been provided a forming technique in the forming of a radial and axial thrust bearing retainer or cage which has its genesis in a flat narrow width of stock so as to obviate the waste inherent in starting from a strip which of necessity dictates a width greater than the largest diameter of the end product.

In the FIG. 3A showing, I have illustrated the FIG. 3 ring as being so formed along its line of jointure 18 that each end of the strip may be provided with one half of an opening 12 so as to define a fully formed opening 12 following jointure.

In the FIG. 9A showing, I have illustrated a FIG. 3 ring subsequently provided with opposite inwardly turned peripheral edges to define an axial thrust bearing.

It is to be understood that axial only retainers and radial only retainers can be produced in accordance with this system.

THE SECOND EXEMPLIFICATION

FIGS. 10-17

A narrow width of strip metal 100 is first provided with equispaced undulations 112 along an edge 114 thereof so as to offer the effect of increasing the overall length of that said edge. See FIG. 10.

Therefollowing and with reference to FIG. 11, certain undulations 112 are flattened as at 112' so as to offer the effect of allowing the length of edge 115 to remain substantially the same while at the same time allowing edge 114 to assume a configuration of an increased length.

In FIG. 12, the formed flat circular ring is shown as resultant from a flattening of all of undulations 112, with the opposite ends of the original strip metal being welded together as at 118.

Now with reference to FIG. 13, another strip of metal 150 is shown where the undulations 152 extend in alternating directions on opposite sides of the major strip plane along side edge 154. The so formed strip is now processed into a ring in the manner previously described, the salitn point being that the undulations (112 as in FIG. 10 and 152 as in FIG. 13) can be on the same side of or on opposite sides of the major plane of the strip.

In FIG. 14, a ball-receiving indentation or depression or pocket 130 is shown as formed in the flat FIG. 12 ring by means of a suitable tool.

With a pair of such rings so formed with a plurality of equispaced ball-receiving pockets, the two rings may be brought into assembled opposed relationship to define a complete cage or ball bearing retainer.

In the fragmentary view of FIG. 15, a butt weld 118 of the opposite ends of the FIG. 12 ring is shown, the butt weld being centrally of one of the ball-receiving pockets 130.

Alternatively, the opposite ends of the FIG. 15 ring may be overlapped, as shown in FIG. 16, with the opposite ends of the ring being strategically flattened at areas 117 of the overlap so as to allow an area of no greater ring thickness thereat than the thickness of any other part of the ring.

THE THIRD EXEMPLIFICATION

FIGS. 18-22F

This exemplification teaches a method of making a flat planar ring of small axial thickness and larger planar dimensions from a ring of greater axial length and smaller planar thickness.

A flat, narrow metal strip 200 (see FIG. 18) is formed into an annular ring, as shown in FIG. 19, with opposite ends 202 and 204 being welded together at 206.

The ring is then formed into a conical configuration such as shown in FIG. 20 preliminary to the next following step of flattening the conical shape to provide the flat horizontal ring shown in FIG. 21, same having an inside diameter which is less than the diameter of the smaller opening of the conical shape of FIG. 20.

It is to be recognized that it would be possible to form the FIG. 19 annular ring into the FIG. 21 flattened ring without proceeding through the FIG. 20 conical configuration step but the first described method is preferred as offering better control in the forming technique process.

The flat ring of FIG. 21 is then deformed to provide half-portions of equispaced ball-receiving pockets 212 when two of such deformed rings are brought into confrontation in a back-to-back relationship in a retainer-defining configuration.

The transformation steps of FIGS. 18-21 illustrate an economical method of making a flat, planar ring, which may be welded or otherwise fused, and which define a ring of small axial thickness and large planar dimensions from a ring of greater axial length and smaller planar thickness.

The formed ring represented in FIG. 22 could also serve as a lock spring washer.

With the steps as represented by FIGS. 18-21, such a ring, so economically produced, can be transformed into any of a multiplicity of shapes and forms, a few of which are exemplified as bearing retainers in each of FIGS. 22A-22F.

The fragmentary views 22A-22F are exemplifications of the various styles of bearing retainers which can be formed from the FIG. 21 flat ring which in turn is formed from the FIG. 19 cylindrical ring.

FIG. 22A illustrates a bearing retainer formed of a ring 210 with an outer peripheral edge 212 turned downwardly and scalloped as at 214 to provide the flexible retaining tabs having the capacity to flex upon assembly and then to spring back so as to lock its captured ball into location and to prevent the retainer from falling free.

FIG. 22B illustrates the FIG. 22A ring 210 with the outer peripheral edge 212 turned downwardly and disposed between inner and outer races 230 and 232 respectively.

FIG. 22C illustrates a radial thrust bearing cage with one edge 242 of a ring 240 turned upwardly and FIG. 22D illustrates a radial thrust bearing cage with two edges 252 of a ring 250 turned upwardly.

FIG. 22E illustrates a radial thrust roller bearing cage formed of a flat ring 260 with an upturned edge 262 and FIG. 22F illustrates a radial thrust roller bearing cage formed of a flat ring 270 with both edges 272 being upturned.

Such flat ring 200 could of course be used for other purposes such as use as washers, lock washers, spacers, and the like.

The significant fact is that I have here provided a forming technique in the forming of a radial and axial thrust bearing retainer or cage having its genesis in a flat narrow width of stock so as thereby to obviate the waste inherent in starting from a strip which of necessity dictates a width greater than the largest diameter of the end product.

THE FOURTH EXEMPLIFICATION

FIGS. 23-31

The method as represented by FIGS. 23-31 relates to the same steps of producing a flat planar ring from a circular tubular ring but with contours being blanked out of the ring edges leading to a radial and axial bearing cage such as suitable for use in bicycles and the like.

The thrust of this system lies in the transformation from a circular ring to a flat ring, with the flat ring being then transformed into a bearing cage.

A narrow width of flat metal 310 (see FIG. 23) is having opposite side edges 312 and 314 and end edges 316, 316 is scalloped along the side edges with equispaced scallops 320, 322 respectively as by punching, as shown in FIG. 24.

The so punched strip 310 is formed into a cylindrical ring, as shown in FIG. 25, with the opposite end edges 316, 316 being welded together as at 317.

In a following forming step (see FIG. 26), the ring is reformed into a frustoconical configuration with the edge 312 defining a relatively small circumference and the edge 314 defining a relatively large circumference.

The conical ring of FIG. 26 is next flattened into a larger ring as shown in FIG. 27 and from such flattened ring the FIG. 28 ring is formed with the inner and outer edges 312 and 314 respectively being turned upwardly in planes normal to the major plane of the ring so as to define a ring having an outer annular wall which is greater in height than the inner annular wall, as best seen in FIG. 29.

The outer annular wall is then turned inwardly and downwardly as shown in FIGS. 30 and 31 to provide a radial and axial bearing cage such as is used in bicycles.

It is to be understood that a single scalloped edge (as shown in FIG. 46) could be substituted here for the double scalloped edge.

The procedure outlined with respect to FIGS. 23-27, could be employed using a single scalloped edge to form the retainers of FIGS. 47, 48, 50, 51, 51A, and 51B.

THE FIFTH EXEMPLIFICATION

FIGS. 32-43

In this exemplification, a method of producing a new style of bearing cage is disclosed.

The outside ring is formed with the outside edges turned inward and the inner ring is formed with the outside edges turned outward. The two are assembled together to make a completed cage for ball or roller bearings, all at substantial savings in material and manufacturing costs.

A planar strip 410, as shown in FIG. 32, is provided with turned side edges 412, 412, as in FIG. 33, and is further provided with ball openings 414 and oil holes 416, as in FIG. 34 or with suitable roller openings, as desired, and as shown in FIG. 34A.

The blank may be formed into an outside larger diameter ring, as shown in FIG. 35, with the opposite end edges being welded as at 418.

Various arrangements of outside rings with outside edges turned inward and inner rings with outside edges turned outward, are shown in FIGS. 36-38, with the two rings being assembled together in each instance to make a completed ball or roller bearing cage.

In FIG. 36, the inside ring 420 is shown as being of somewhat smaller dimension so that its outwardly turned outside edges 422 are snugly receivable within the outside edges 426 of outside ring 424.

In FIG. 37, the inside ring 430 is again shown as being of smaller dimension than outside ring 434 and its outside edges 422 seat against the inside surface of the outside ring.

In FIG. 38, the inside and outside rings 440 and 444 are of such dimension that their respective outside edges are brought into confrontation with each other. Alternatively, they may be spaced from each other as by spacers.

As shown in FIG. 39, the outside ring 454 may be provided with beveled ball openings 456 and a ring 450 without outwardly turned outside edges may be substituted as the inside ring.

As shown in FIG. 40, weld upsets 419 may be provided in the FIG. 33 blank.

The FIG. 41 inside ring may be brought into conjoint relationship with the FIG. 35 outside ring as shown in FIG. 42.

The ball openings 462 of an inside or outside ring 460 may be provided with a beveled edge 464 as shown in FIG. 43.

THE SIXTH EXEMPLIFICATION

FIGS. 44-51

In FIGS. 44-51, there is illustrated various steps in the process of making various forms of a sixth exemplification of a bearing cage and the products therefrom.

A planar strip 510, as shown in FIG. 44, is provided with an upturned side edge 512, as in FIG. 45, and is further provided with a scalloped edge 514, as in FIG. 46, which edge may also be provided with weld tabs 516.

The blank may be formed into an outside annular ring, as shown in FIG. 47, with the opposite end edges being welded as at 519.

Similarly, an inside annular ring as shown in FIG. 48 may be formed with the opposite end edges being welded as at 539.

The outside ring with edge turned inwardly is of larger diameter than the inside ring with edge turned outwardly.

It is to be understood that roller bearings could be substituted for the ball bearings disclosed with strategically scalloped interfaces.

As shown in FIG. 51, the FIG. 50 bearing cage has been modified to a frustoconical configuration with tapered inside and outside bearing cages 530 and 532 respectfully.

THE SEVENTH EXEMPLIFICATION

FIGS. 52–55

In FIGS. 52–55 is exemplified a new style of bearing cage and the steps in its production are described.

A width of strip metal 610 is first provided with a plurality of equispaced cylindrical sleeves 614 which are punched outwardly from the flat strip and which sleeves are of such dimension as to be adapted to retain balls B as shown in FIGS. 54 and 56.

The flat strip may be formed into a cylindrical ring, as shown in FIG. 55, with the opposite ends being welded together along the line of jointure at 618.

I claim:

1. A method of transforming a flat narrow strip of stock into one half of a bearing retainer cage of cyclodial undulated configuration comprising the steps of: forming a closed ring from a narrow strip of stock with the confronting edges fused together, transforming the ring into a frustoconical configuration, transforming the frustoconical configuration into a flat planar configuration, and transforming the flat planar configuration into equispaced ball retaining undulations of cyclodial configuration.

2. A method of producing a component of a bearing retaining cage with undulations of cyclodial configuration comprising the sequential steps of: forming a strip of flat stock into a unitary tubular ring with its confronting edges fused together, forming the tubular ring into a frustoconical shape, flattening the frustroconical shape into a flat planar ring, and forming undulations of ball retaining cyclodial configuration in the flat planar ring.

3. A method of producing a one half section of a bearing retainer cage with an undulated cyclodial configuration comprising the steps of: forming a flat narrow strip into an annular ring, fusing together the abutting edges, forming the ring into a frustoconical configuration, flattening the frustroconical configuration into a flat ring of thin radial thickness and reforming the radial plane of the flat ring into ball receiving undulations of cyclodial configuration.

4. A method of manufacturing a bearing component with ball retention pockets of undulated cyclodial configuration comprising the steps of: forming a closed ring from a narrow strip of stock, fusing together the abutting edges of the ring, transforming the ring into a frustroconical configuration, transforming the frustroconical configuration into a flat planar configuration, and undulating the flat planar configuration with a series of ball retaining depressions each of cyclodial configuration.

5. A method of forming a bearing component such as a cage, ring, retainer or spacer with a circumferentially-disposed, radially-arranged series of pockets comprising the sequential steps of: forming a strip of flat stock into a unitary tubular ring with its confronting edges fused together, forming the tubular ring into a frustoconical shape, flattening the frustroconical shape into a flat planar ring, and forming undulations of ball retaining cyclodial configuration in the flat planar ring.

* * * * *